United States Patent [19]
Jones

[11] 4,158,125
[45] Jun. 12, 1979

[54] PORTABLE HOLDER AND HEIGHT ADJUSTER FOR ELECTRIC WARMER

[76] Inventor: Don Jones, Rte. 47, R.D. 2, P.O. Box 173, Cape May Court House, N.J. 08210

[21] Appl. No.: 889,645

[22] Filed: Mar. 24, 1978

[51] Int. Cl.² .............................................. F27D 11/02
[52] U.S. Cl. ..................................... 219/433; 211/26; 211/49 D; 219/214; 219/385; 219/386; 219/434; 312/71; 312/236
[58] Field of Search .............. 219/214, 385, 430, 386, 219/432, 433, 434, 436, 441, 444, 521; 312/71, 236, 248; 211/49 D, 26; 428/210

[56] References Cited
U.S. PATENT DOCUMENTS

| 3,053,600 | 9/1962 | Holloway | 312/71 |
| 3,190,453 | 6/1965 | Shelley | 211/49 R |
| 3,351,741 | 11/1967 | Shelley | 219/385 |
| 3,407,015 | 10/1968 | Silverberg | 312/71 |
| 3,440,406 | 4/1969 | Sego, Jr. | 219/444 |
| 3,493,725 | 2/1970 | Mackay | 219/385 |
| 3,511,548 | 5/1970 | McIlhone | 312/71 |
| 3,536,891 | 10/1970 | Lee et al. | 219/385 |
| 3,806,218 | 4/1974 | Cummings | 312/71 |

Primary Examiner—Volodymyr Y. Mayewsky

[57] ABSTRACT

A portable holder and height adjuster for beverage warmers is provided to improve the storage of a heated beverage for long periods of time and to reduce evaporation and spoilage that holds the partially filled decanter above the warming element on decanter holders suspended on adjustable compressible springs which are clamped to the base of the warmer.

6 Claims, 4 Drawing Figures

PORTABLE HOLDER AND HEIGHT ADJUSTER FOR ELECTRIC WARMER

BACKGROUND OF THE INVENTION

Over the last few years, automatic coffee makers have gained wide popularity. In these devices a measured amount of water is poured into the back container of the coffee maker. The ground coffee is placed in a paper filter in a plastic holder which fits on top of a glass decanter which is placed under the pour spout of the coffee maker. The water is heated and fed out of the pour spout through the ground coffee and filter into the decanter. A heating element is located in the base of the coffee maker and after the coffee has been brewed, it is presumably designed to maintain the temperature of the coffee.

However, in order to maintain a reasonable temperature for a full pot of coffee, the warmers have been designed such that they over heat smalleer quantities of coffee and in particular are completely insufficient to maintain a reasonable temperature for a few leftover cups of coffee.

For example, in a typical coffee maker, the coffee reaches the decanter immediately after the brewing step at about 190° F. When ten cups, as measured on the device, are brewed the coffee held in the decanter has cooled to about 158° F. after one hour with the warmer on. When eight cups are brewed the coffee is maintained at 160° F. after one hour but a full one-half cup liquid measure has evaporated. If six cups have been brewed the temperature after one hour has reached 164° F. If three cups are brewed the temperature has reached 170° F. after one hour and even more than the one-half cup liquid measure has been lost to evaporation. It will be apparent that the quality of the coffee suffers as a result of the evaporation and the variable temperature and storage on the heater of lesser quantities of coffee is not only impractical but dangerous. The smaller amount of coffee in the decanter the higher the temperature reaches until a hazard results.

While this is one example of difficulties with warmers, it will be apparent to the reader that these difficulaties and problems with coffee makers are not uncommon with any warmer or heating element device where the temperature of the liquid is preferably maintained at a given level irrespective of the amount of liquid in the container. For all simple warmers or heaters used for food, heat conduction and cooling effects will depend upon the amount of liquid in the container thus causing the temperature of the liquid to vary depending upon that amount. For many applications other than coffee this is totally unsatisfactory and warmers for tea, sauces, and the like are particularly susceptible to this problem. It will be apparent that there are other applications outside the food field where this problem exists and it is particularly troublesome when it is not practical nor desirable to insert some type of electrical control sensor in the liquid itself.

Accordingly, it is an object of this invention to provide a holder and height adjuster which will be directly responsive to the amount of liquid held in the container to be warmed. It is an additional object of this invention to provide an adjuster which may be attached to the warmer without interconnection into the electrical circuit of the warmer.

It is an additional object of this invention to provide an adjuster directly responsive to the amount of liquid to be warmed such that a single chosen temperature may be maintained irrespective of the amount of liquid removed from the container.

It is an additional object of this invention to provide a holder and height adjuster capable of maintaining a chosen temperature while avioiding any direct contact with the liquid being warmed.

It is an additional object of this invention to provide a holder and height controller which is directly responsive to the amount of liquid being warmed and is adjustable to a prechosen temperature to be held irrespective of the amount of liquid being warmed.

It is an object of this invention to provide a holder and height adjuster capable of maintaining a single prechosen temperature in a container wherein the heat transfer characteristics are such that the temperature maintained is dependant upon the amount of liquid in the container.

DESCRIPTION OF THE PRIOR ART

In U.S. Pat. No. 2,020,364 Lehmann describes a vaporizer device wherein a switch is actuated by the container weight. In U.S. Pat. Nos. 1,954,551 and 2,152,122 Wilcox discloses cooking utensils wherein the heating element is immersed and the electrical controls are in direct contact with the fluid. A number of devices have been disclosed wherein the placement of the container on the heating element or removal therefrom actuates a switch which controls the electricity reaching the heating element. These include U.S. Pat. No. 2,611,069 to Frazier, U.S. Pat. No. 2,666,128 to Crawford et al and U.S. Pat. No. 3,004,131 to Gilissen. U.S. Pat. No. Re. 23,804 to Jepson et al provides for temperature control of the liquid in the container through electronic control means. Thermostatic controls touching the outside of the container are described in U.S. Pat. No. 2,660,658 to Wagner et al and U.S. Pat. No. 2,786,930 to Weber et al. In an electrical bottle warmer described in U.S. Pat. No. 3,892,945 by Lerner a water level sensor immersed in the liquid is used to control the electrical system.

SUMMARY OF THE INVENTION

This invention is directed to a holder and height adjuster which may be attached to the exterior of beverage warmers having an electrically heated element housed in a base to automatically adjust the amount of heat and thus control the temperature of liquid in a decanter, the temperature depending upon the amount of liquid in the decanter including at least two decanter holders to hold and suspend the beverage container above the warmer heating element at various heights. At least two support arms capable of resting on the base are rigidly connected to spring enclosures at least one for each decanter holder which house a compressible spring device. Spring depressors, at least one for each decanter are rigidly connected at one end to the decanter holder and at the other end bearing against the spring in such a fashion so as to translate the pressure of the variable amount of liquid in the decanter to compression of the spring such that the height of the bottom of the decanter over the heating element is inversely proportional to the amount of liquid in the container. The support arms are connected to each other at a pivot point so as to allow the support arms to pivot in a horizontal position over the base to place the decanter holders in a position to fit various size decanters. A bracket system is provided for holding the support arms at their pivot points so that they will not pivot during use and further holding the support arms to the base in a firm fashion.

DESCRIPTION OF PREFERRED EMBODIMENTS

Figure 1:
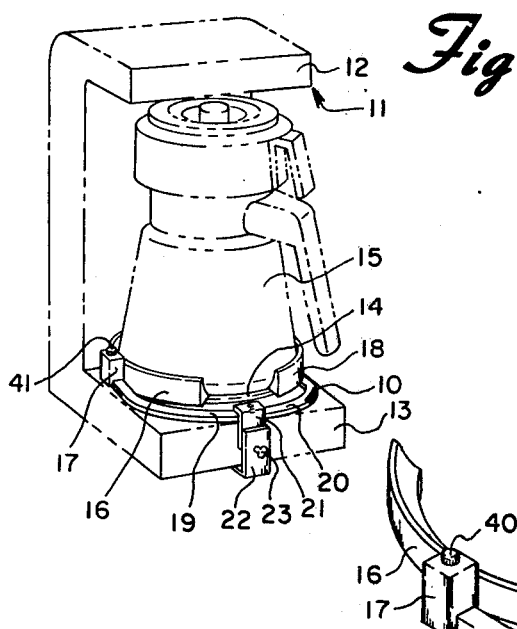
FIG. 1 is a perspective view of the portable holder and height adjuster in position on a coffee maker holding a decanter in position.
Figure 2:
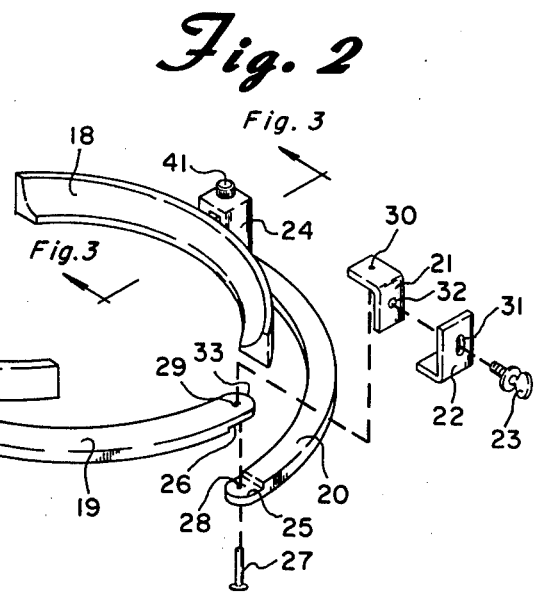
FIG. 2 is an exploded perspective view of the holder and height adjuster of this invention showing the individual component parts ready for attachment.

The holder and height adjuster 10 of this invention is shown in place and ready for use on coffee warmer 11 in FIG. 1. Coffee maker body 12 extends over coffee decanter 15 which normally rests on heating element 14 which is part of base 13. When heat adjuster 10 is in use, coffee decanter 15 rests on decanter holders 16 and 18 which hold coffee decanter 15 above heating element 14, when decanter 15 is less than full of liquid. Decanter holder 16 is partially supported by a spring in enclosure 17 which is rigidly connected to support arm 16. Support arm 20 is rigidly connected to a spring in enclosure 24, which is shown in FIG. 2 and further supports decanter 18. Support arms 16 and 20 are held to base 13 by top "L" clamp 21 and bottom "L" clamp 22, interconnected and held by thumb screw 23.

In FIG. 2, the portable heating element adjuster system is shown in an exploded perspective view. In this view, support arms 19 and 20 are shown as they are interconnected through pin 27 which extends through hole 28, hole 29 and finally through hole 30, the latter being through upper "L" clamp 21. Support arm 19 has cut-out shoulder 26 which interfits into cut-out shoulder 25 on support arm 20, such that the total height when interfitted is equal to the thickness of either arm 19 or arm 20. Support arm 19 has rounded ends 33 which allow horizontal adjustment for positioning of arms 19 and 20 so that decanter holders 16 and 18 will firmly hold coffee decanter 15 above heating element 14. In this view, it is shown that decanter holder 18 is supported by spring enclosure 24 and decanter holder 16 is supported by spring enclosure 17, both rigidly connected to support arm 19 and 20 respectively. Upper "L" clamp 21 interfits over support arm 19 and holds support arm 19 and support arm 20 to base 13 through compressive pressure provided by lower "L" clamp 22 which is interconnected through thumb bolt 23 which passes through oblong hole 31 and into threaded hole 32. Radial grooves on shoulders 25 and 26 prevent horizontal movement when clamped together.

Figure 3:
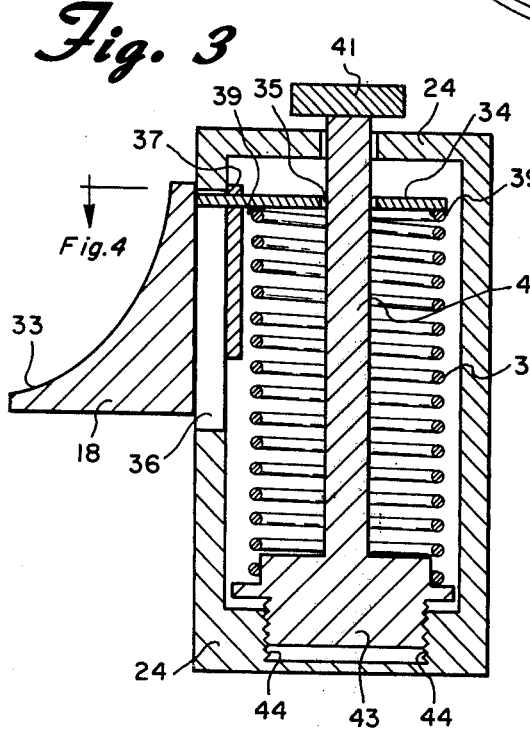
FIG. 3 is a cross-sectional view along lines 3—3 of FIG. 2 showing the internal construction of the spring control system.
Figure 4:
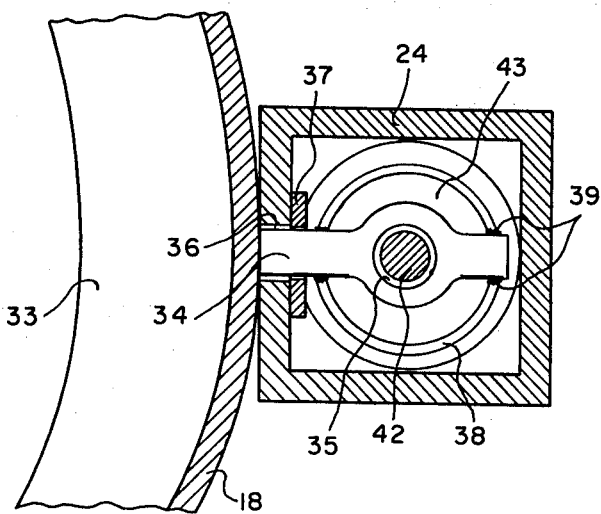
FIG. 4 is a horizontal cross-sectional view along lines 4—4 in FIG. 3.

FIG. 3 is an expanded vertical cross-sectional view of spring enclosure 24 showing how decanter holder 18 which holds the coffee decanter on shoulder 33 is connected to spring depresser 34 which extends through slot 36 in spring enclosure 24. Spring depressor 34 is welded to the top of spring 38 at points 39 so that spring 38 may be compressed against bottom spring holder 43. Guide 37 is welded to spring depresser 34 and rides on the inside surface of spring enclosure 24 to prevent holder 18 from dropping down. The tension of spring 38 and thus the height of decanter 15 above the heating element at a given amount of liquid in the decanter may be adjusted by turning knob 41 which is connected by rod 42 to bottom spring holder 43 which is threaded to engage threads 44 in the body of spring enclosure 24. The spring enclosure 24 is further illustrated in a partial horizontal cross-sectional view in FIG. 4 taken along lines 4—4 of FIG. 3. In this view, holder 18 is shown with shoulder 33 from above and shows how spring depresser 34 fits in slot 36 from above and is held in position by retainer 37. Hole 35 in spring depresser 34 allows space for rod 42 to interconnect with holder 43.

By vertical off-setting the height of spring depresser 34 from the base of decanter holder 18, spring 38 is never completely compressed even when the decanter is resting on element 14 of coffee maker 11. Spring enclosure 17 and the mechanism inside it are identical to that shown for spring enclosure 24 in FIGS. 3 and 4. In this fashion, the respective height of the coffee decanter above the heating element at a given amount of coffee liquid may be controlled by the choice of the spring compression in spring 38.

In the device pictured in FIGS. 1 to 4, with only three cups brewed and held in the warmer for one-hour, the temperature is controlled at 147° F. and less than one-quarter cup of liquid is lost to evaporation during that period of time. Since evaporation becomes even more important as the volume of beverage to be warmed is reduced this improvement is most important.

While this invention has been described with reference to the specific embodiments disclosed herein it is not confined to the details setforth and the patent is intended to include modifications and changes which may come within and extend from the following claims.

I claim:

1. In a warmer having a liquid holding container on an electrical heating element housed in a base capable of heating a liquid to a temperature dependant upon the amount of liquid in the container, a detachable, portable holder and height adjuster for the liquid container to automatically control heat transfer from the electrical heating element to the liquid in the container, said adjuster comprising:

(a) at least two container holding means to hold and suspend the liquid container at various heights above the warmer heating element, (b) at least two spring enclosures each housing a compressable spring means, (c) at least two spring depresser members each having two ends, one end of each rigidly connected to one of the container holder means and the other end bearing against the spring means in such a fashion so as to translate the pressure of the weight of the liquid in the container to compression of the spring means such that the height of the bottom of the container over the heating element is inversely proportional to the amount of liquid in the container, (d) at least two support arms resting on the base rigidly connected to the spring enclosures and connected to each other through a pivotal connection on one end to allow the arms to pivot in a horizontal position to cause the container holding means to fit the size of the container, and (e) bracket means holding and providing compression around the pivotal connection by connected ends of the support arms, maintaining their position with respect to each other, and around the base to hold the entire holder and height adjuster to the base of the warmer.

2. The holder and height adjuster of claim 1 wherein respective elevation of the spring depressing member is above the bottom of the container when supported by the decanter holding means to allow the spring to be incompletely compressed when the container is full of liquid and resting on the heating element.

3. The holder and height adjuster of claim 1 wherein the container holding means are two partial annular shapes each having a circumferential length of about one-third that of the container and having an annular shoulder extending towards the container on which the container rests and is suspended above the heating element.

4. The holder and height adjuster of claim 1 wherein a spring compression adjuster is included comprising a threaded base spring holder which is threadably engaged into the body of the spring enclosure, an adjustment rod rigidly connected and extending vertically upwadly from the lower spring holder through the body of the spring enclosure and rigidly attached to an adjustment knob which may be turned to vertically position the bottom of the spring and change the spring tension.

5. The holder and height adjuster of claim 1 wherein the support arms are interfitted with radial grooves on their interfacing surfaces directed to a pair of holes through the support arms into which a vertical pivot pin is placed which extends through the holes and into an interlocking bracket holding the arms together and to the base by compressive force.

6. The holder and height adjuster of claim 1 wherein the bracket means comprise an upper "L" bracket inverted in its operating position fitting over the support arms, a lower "L" bracket with its horizontal arm fitting under the base and a hand bolt fitting through a vertically lengthened oblong hole in the lower "L" bracket and into a threaded hole in the vertical arm of the upper "L" bracket.

* * * * *